Jan. 9, 1962 J. W. WHITE 3,016,322
MACHINE FOR BUILDING TIRE BEADS
Filed Feb. 2, 1959 10 Sheets-Sheet 1

INVENTOR.
John W. White,
BY

Jan. 9, 1962   J. W. WHITE   3,016,322
MACHINE FOR BUILDING TIRE BEADS
Filed Feb. 2, 1959   10 Sheets-Sheet 3

INVENTOR.
John W. White,
BY Brown, Jackson
Boettcher & Dienner Atty's.

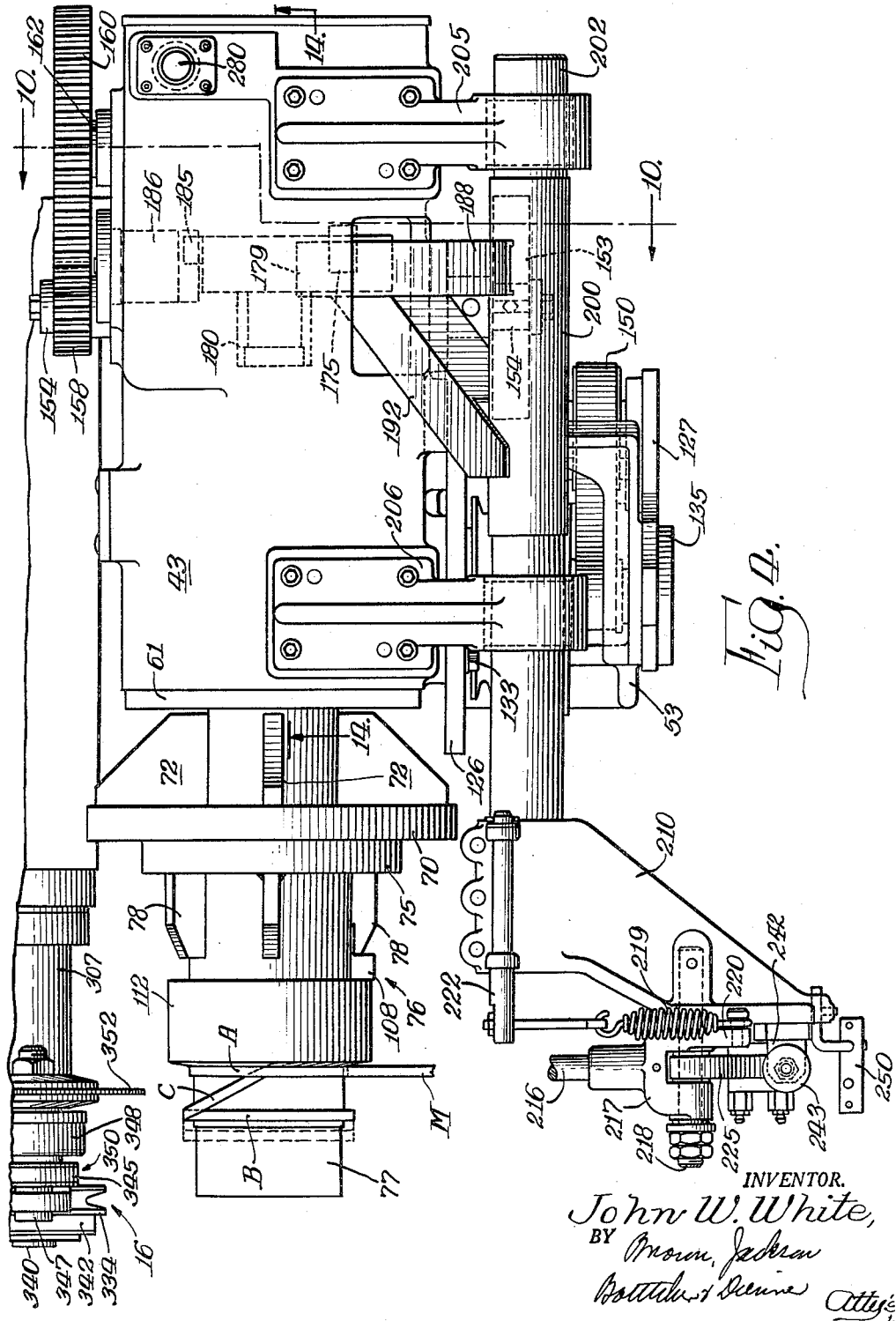

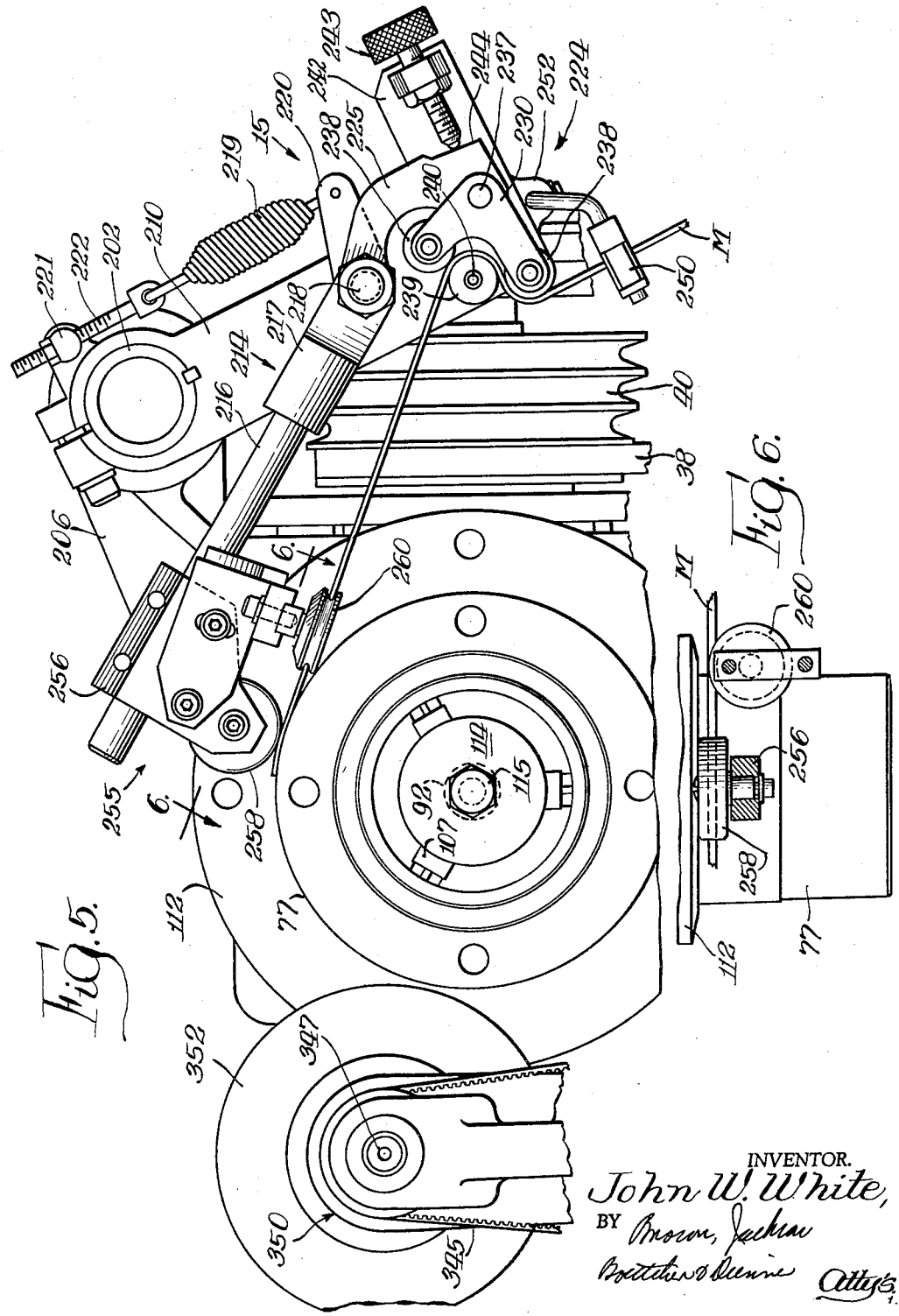

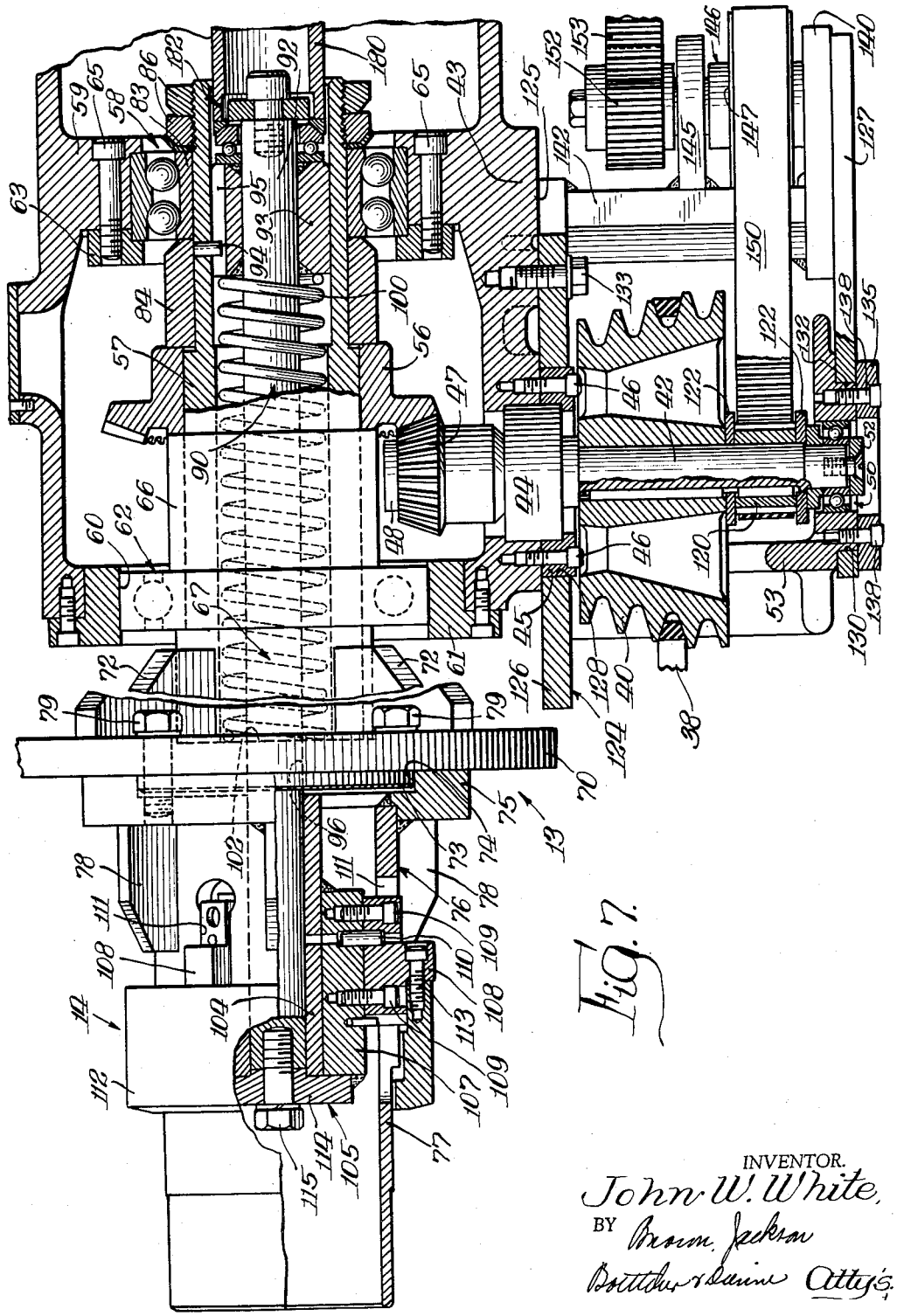

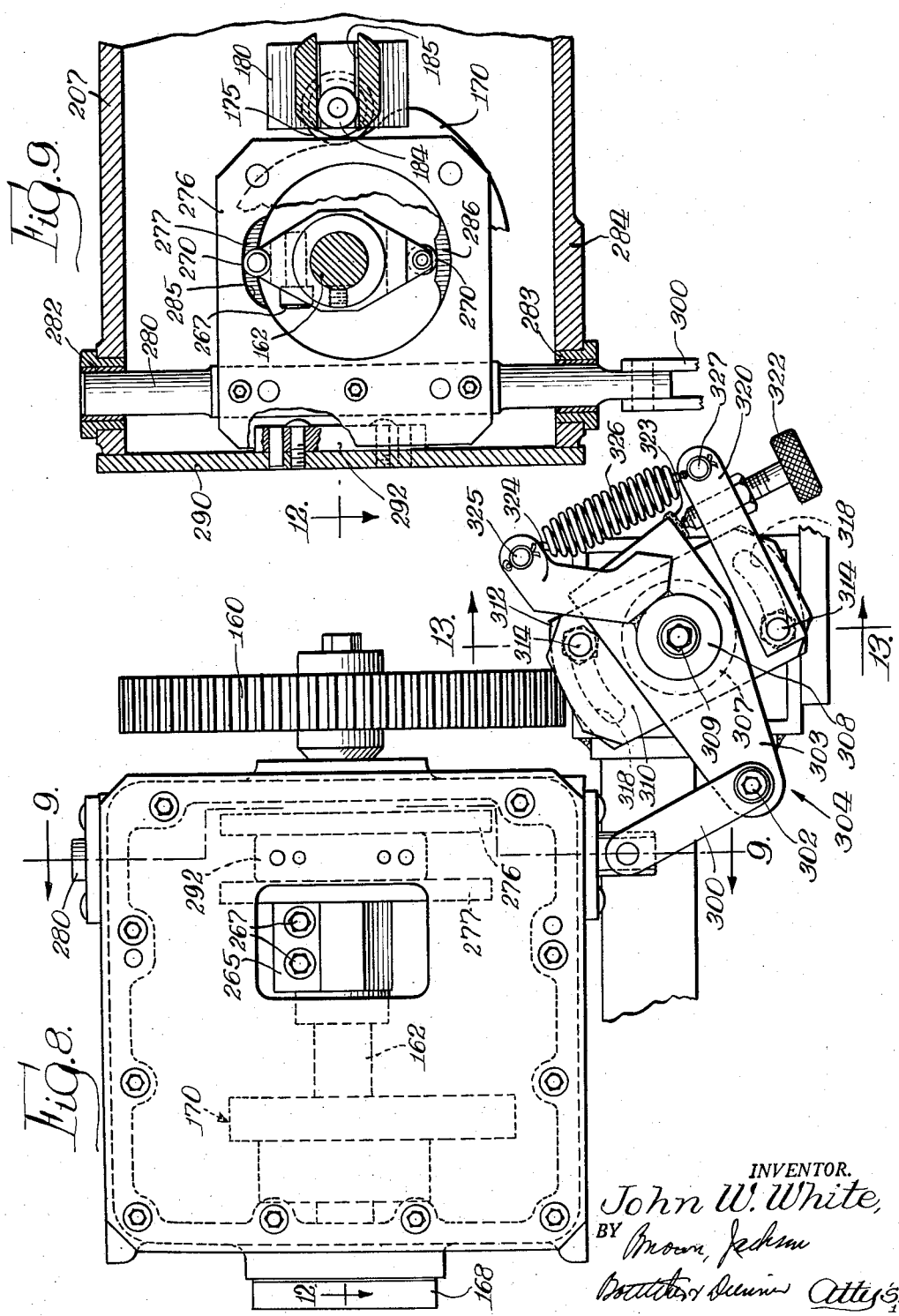

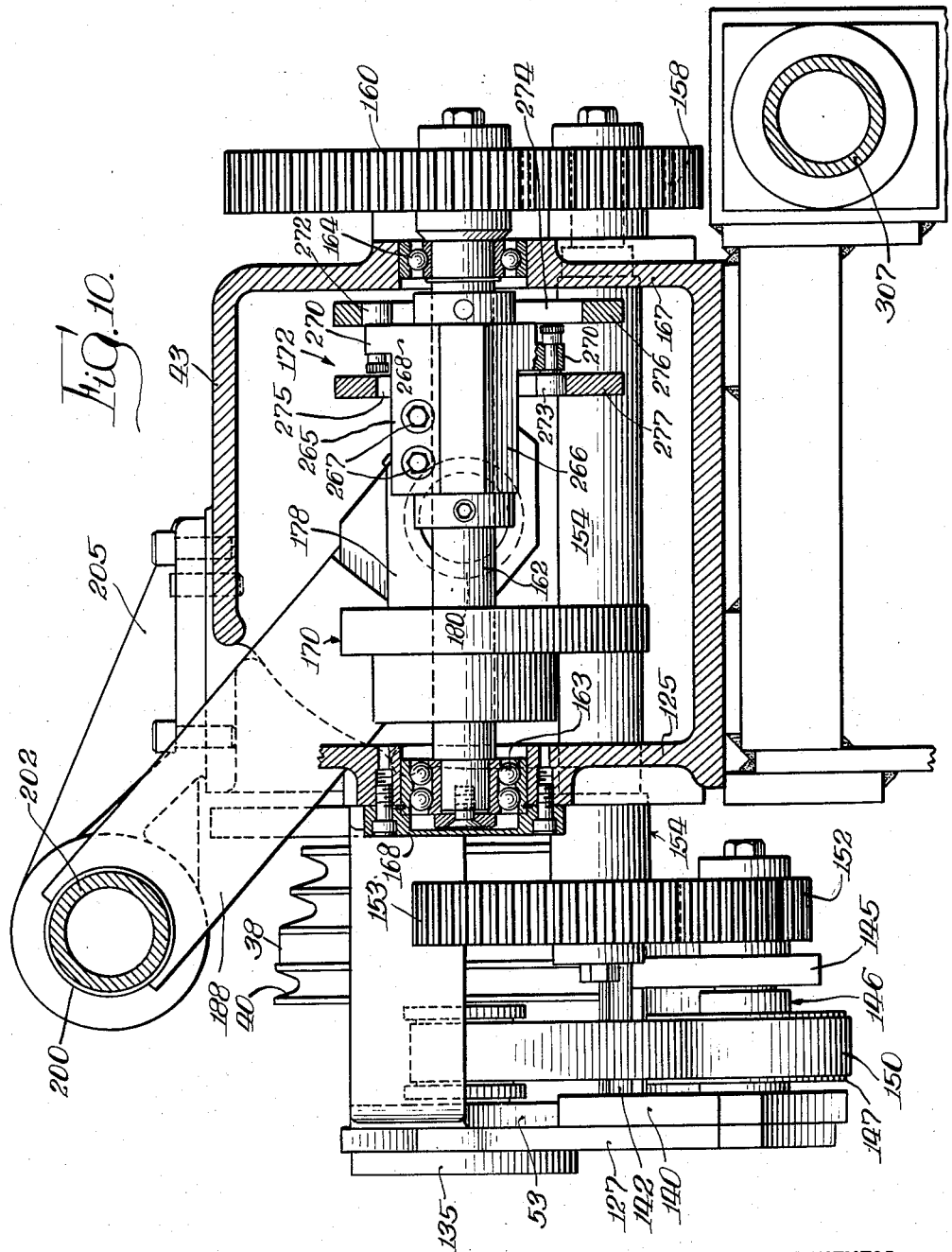

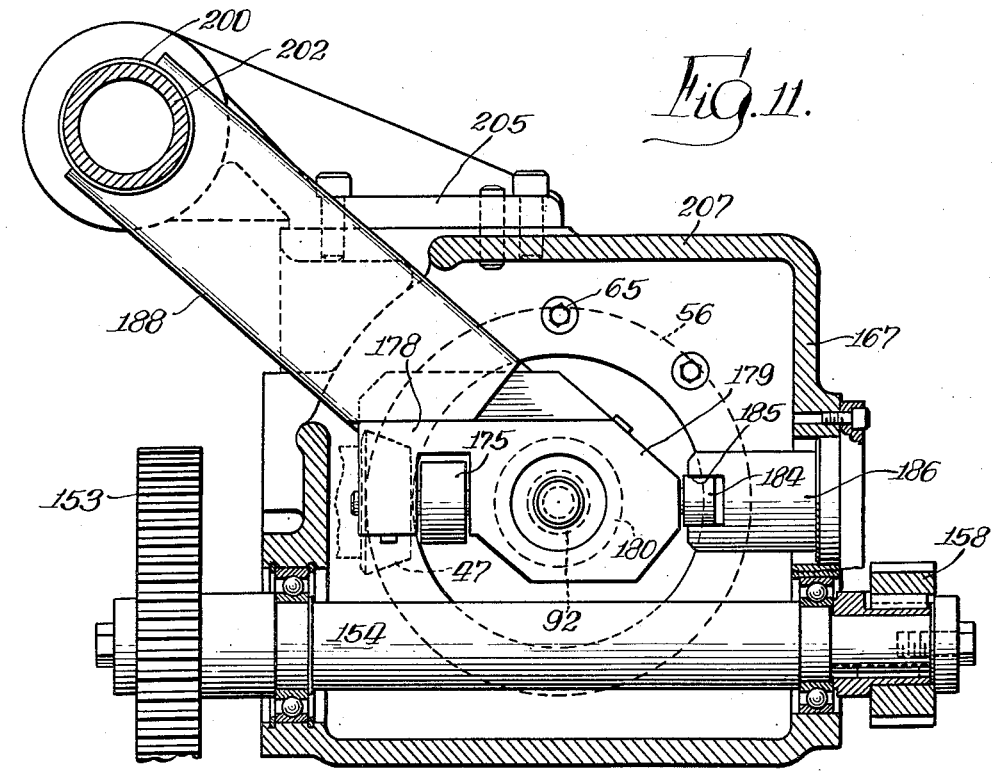

Jan. 9, 1962 J. W. WHITE 3,016,322
MACHINE FOR BUILDING TIRE BEADS
Filed Feb. 2, 1959 10 Sheets-Sheet 10
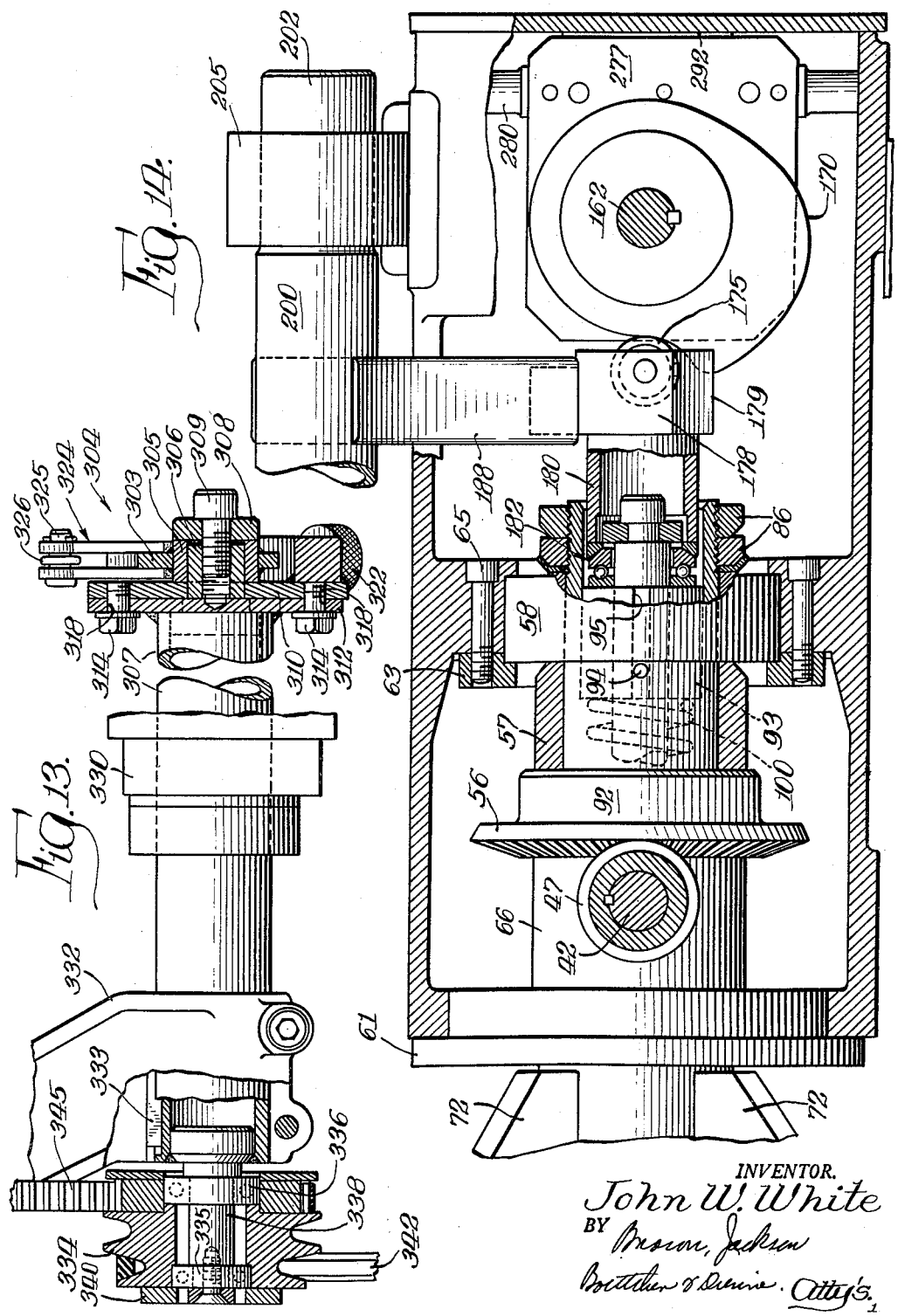
INVENTOR.
John W. White
BY Mason, Jackson
Boettcher & Devine Atty's.

United States Patent Office 3,016,322
Patented Jan. 9, 1962

3,016,322
MACHINE FOR BUILDING TIRE BEADS
John W. White, Wadsworth, Ohio, assignor to National-Standard Company, Niles, Mich., a corporation of Delaware
Filed Feb. 2, 1959, Ser. No. 790,532
9 Claims. (Cl. 156—422)

My present invention relates to a tire bead building machine.

Known tire bead building machines are of two general classes. One class of such machines incorporates a rotatable and collapsible former having gripper means which in a stationary bead starting position of the former is open to receive the end of a supply of bead material for forming a tire bead. The gripper means is then closed and the former rotated a predetermined number of revolutions and then stopped to provide a tire bead of the desired number of turns of bead material. The bead material extending from the supply is then severed, the former collapsed, the gripper means opened, and the completed bead is then removed or ejected. The above described cycle is then repeated for forming a succeeding tire bead on the machine.

The other of the two classes of tire bead building machines above mentioned includes a continuously driven winding head having a plurality of coil forming means mounted for conjoint rotation therein, and about which coil forming means tire bead material is wound in superposed convolutions to form a tire bead. Upon completion of a tire bead, the coil forming means aforementioned are rotated in the winding head to advance the bead thereon to a discharge position. In the continued rotation of the winding head, the tire bead material is then wound around other portions of the coil forming means to form a succeeding bead. The connecting of cross-over portion of tire bead material between the two beads is severed and the first formed bead is discharged from the winding head.

Known machines of the character indicated are incapable of making tire beads of small diameter, for example, of the order of six inches, lack flexibility in conveniently determining the overlapping relation of the ends of the innermost and outermost convolutions of the wound bead material, and even in light of the aforementioned disadvantages, are of complex construction.

It is an object of my invention to provide an improved tire bead building machine in which the shortcomings of the prior art are readily and simply accomplished.

It is a further object of my invention to provide a tire bead building machine in which a tire bead of any given predetermined number of complete convolutions may be readily fabricated, and in which the outermost convolution may have its end aligned or in any desired overlapping relation with respect to the end of the innermost convolution of the tire bead.

A further object of my invention is to provide a machine in which tire bead material is adapted to be wrapped in superposed convolutions on a substantially cylindrical surface of a rotating former including positioning means movable relative to the former longitudinally of the axis of rotation of the latter, operable during formation of a bead to move the latter axially on said former to a bead finishing position, and upon completion of the bead to provide for positioning of tire bead material at a bead starting position on the former to begin the formation of the next succeeding bead on the former.

A further object is to provide a machine as last mentioned including guide or bead material laying means movable conjointly with the positioning means for affording laying of tire bead material in superposed convolutions around the former.

A further object is to provide a machine as above noted including cut-off means for severing tire bead material extending from the outer convolution of a completed tire bead and the inner convolution of the next succeeding bead on the former.

A further object is to provide a tire bead building machine including a former and positioning means as aforesaid in which timing means is provided to effect predetermined relative movement between the positioning means and former with respect to a given whole or partial number of revolutions of the former to afford the construction of a tire bead of any desired predetermined length of tire bead material, and in which the end of the outermost convolution is disposed circumferentially of the bead in a predetermined position relative to the circumferential position of the end of the innermost convolution of the bead.

It is a further object of my invention to provide a machine as last above noted in which cut-off means is actuated at a predetermined position of the positioning means and former to afford for cutting the cross-over tire bead material extending from the outer convolution of a completed bead to the inner convolution of the succeeding bead on the former.

In the machine of my invention in accordance with the aforementioned objects, tire bead material is laid on a rotating former at a bead starting positioning for winding in superposed convolutions around the former and, before completion of the bead, wound material on the former is positioned and moved by positioning means axially of and on the former to a bead finishing position. Upon completion of the desired number of complete or partial convolutions of tire bead material, the positioning means is moved relative to the former to a position to begin the construction of the succeeding bead and for which the preceding bead serves as an anchor for effecting initial winding of tire bead material around the former for the succeeding bead. After the material is adequately anchored to the former surface for the succeeding bead, cut-off means is actuated to sever the cross-over material between the bead under construction and the previously completed bead and before the succeeding bead is advanced on the former by relative movement between the positioning means and the former. After the cross-over portion has been cut, the free ends, one being the free end of the outermost convolution of the previously completed bead, and the other the free end of the innermost convolution for the succeeding bead, are adapted to be positioned appropriately with respect to their associated tire beads by the abutting of the opposed ends of adjacent beads against each other effected by the relative movement of the positioning means and the former in moving a bead to the finishing position on the former. The former preferably is of sufficient axial length to accommodate a plurality of completed beads at its outer or bead discharge end so that the positioning means, in its relative movement toward the bead finishing position forces the completed beads into end to end abutting relation with each other as they approach the discharge end of the former.

The above and other objects and advantages of my invention will appear from the following detailed description of a preferred embodiment of my invention.

Now in order to acquaint those skilled in the art with the manner of constructing and operating a bead building machine in accordance with the principles of my present invention, I shall describe in connection with the accompanying drawings, a preferred embodiment of my invention.

In the drawings:

FIGURE 4 is a partial plan view of the bead building machine of FIGURE 1 taken substantially along the line 4—4 on FIGURE 1, and looking in the direction indicated by the arrows;

FIGURE 5 is a front end elevational view of a portion of the tire building machine of the aforementioned figures showing the former assembly, positioning means, tire bead material guide or laying means, and cut-off disc of the cut-off assembly;

FIGURE 6 is a detail horizontal sectional view taken substantially along the line 6—6 on FIGURE 5 looking in a direction indicated by the arrows;

FIGURE 7 is a partial horizontal cross-sectional view of the former assembly and positioning means taken substantially along the line 7—7 on FIGURE 3 looking in the direction indicated by the arrows and with certain of the parts being shown in elevation;

FIGURE 8 is a rear end elevational view of a portion of the tire bead building machine shown in the previous figures with the view being taken substantially on line 8—8 of FIGURE 2 looking in the direction indicated by the arrows;

FIGURE 9 is a detail vertical sectional view showing cam means for the positioning means and cut-off assembly taken substantially on the line 9—9 on FIGURE 8 looking in the direction indicated by the arrows;

FIGURE 10 is a detail vertical sectional view with certain parts being shown in elevation showing the arrangement for driving of a cam shaft for tire bead material guiding or laying means, the positioning means and cut off assembly taken substantially along line 10—10 on FIGURE 3 looking in the direction indicated by the arrows;

FIGURE 11 is a detail vertical sectional view showing parts of the tire bead material guide or laying means taken substantially along line 11—11 on FIGURE 3 looking in the direction indicated by the arrows;

FIGURE 12 is a detail horizontal sectional view of cam means for the cut-off assembly taken substantially along the line 12—12 on FIGURE 8 looking in the direction indicated by the arrows;

FIGURE 13 is a detail vertical sectional view of rock shaft means for the cut-off assembly taken along line 13—13 on FIGURE 8 looking in the direction indicated by the arrows; and FIGURE 14 is a detail vertical sectional view of cam means for actuating the positioning means taken substantially along the line 14—14 on FIGURE 4 looking in the direction indicated by the arrows.

Figure 1:
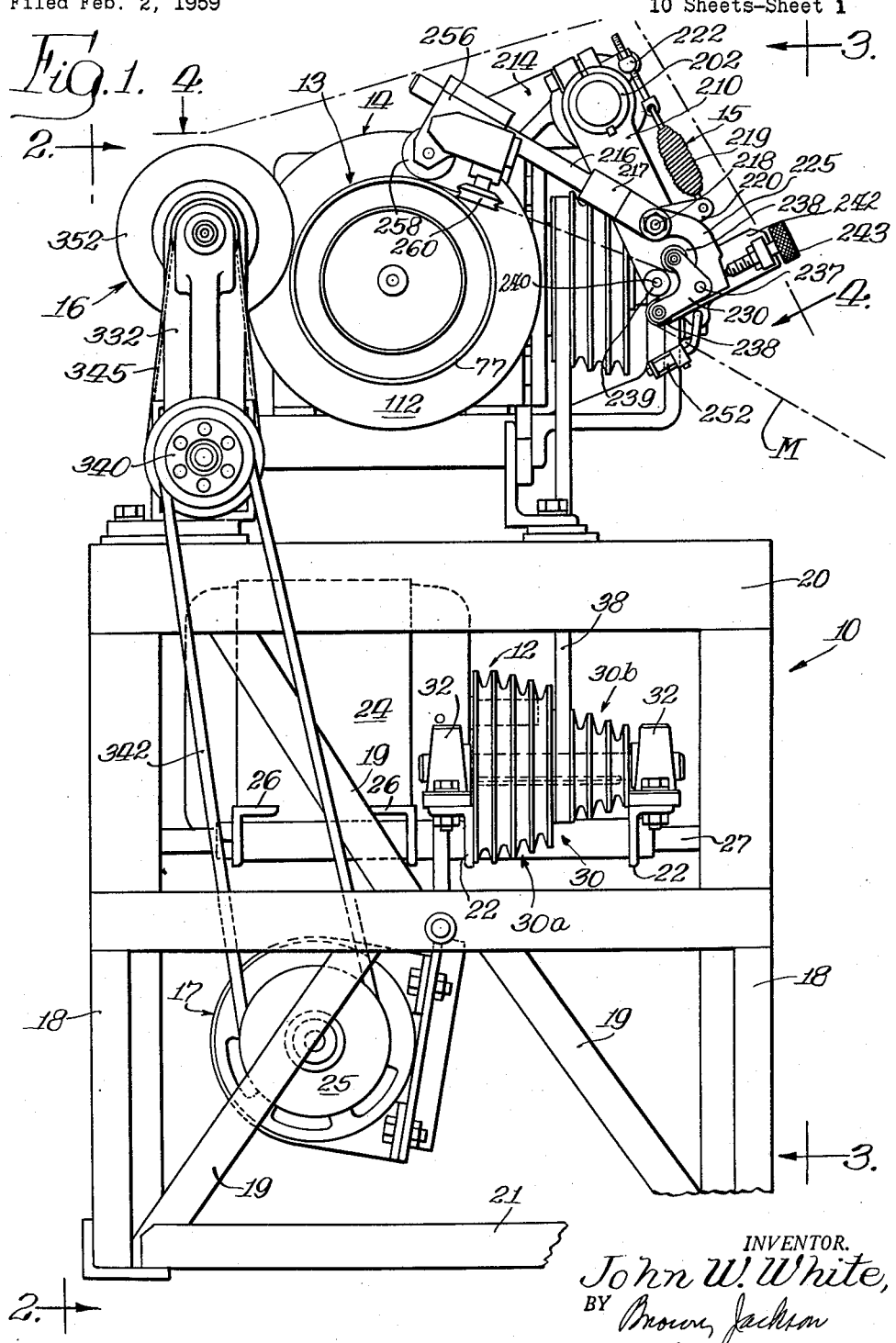
FIGURE 1 is a front end elevational view of a tire bead building machine constructed in accordance with my invention.
Figure 2:
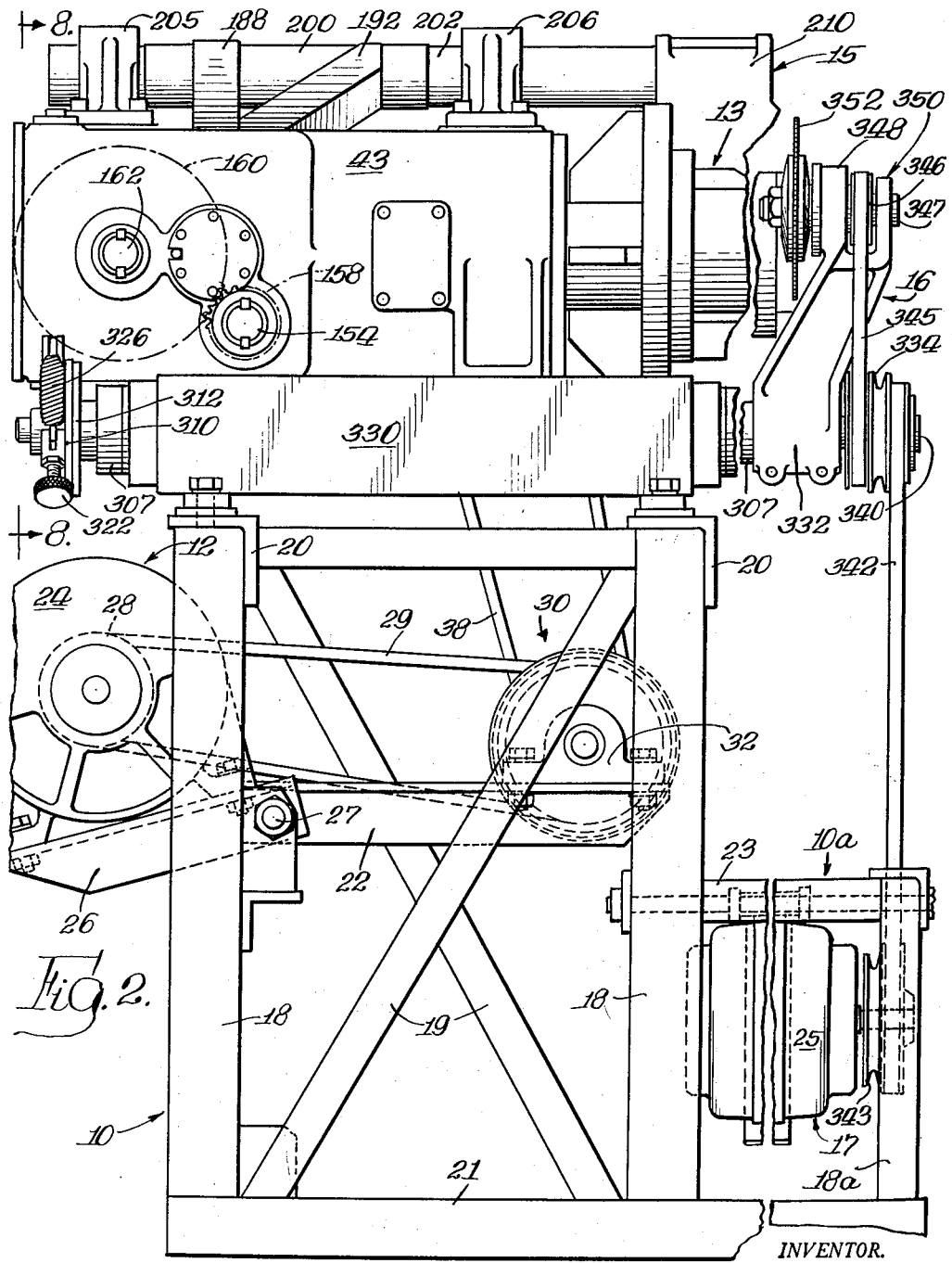
FIGURE 2 is an elevational view of one side of the bead building machine shown in FIGURE 1 taken along the line 2—2 on FIGURE 1 and looking in the direction indicated by the arrows.
Figure 3:
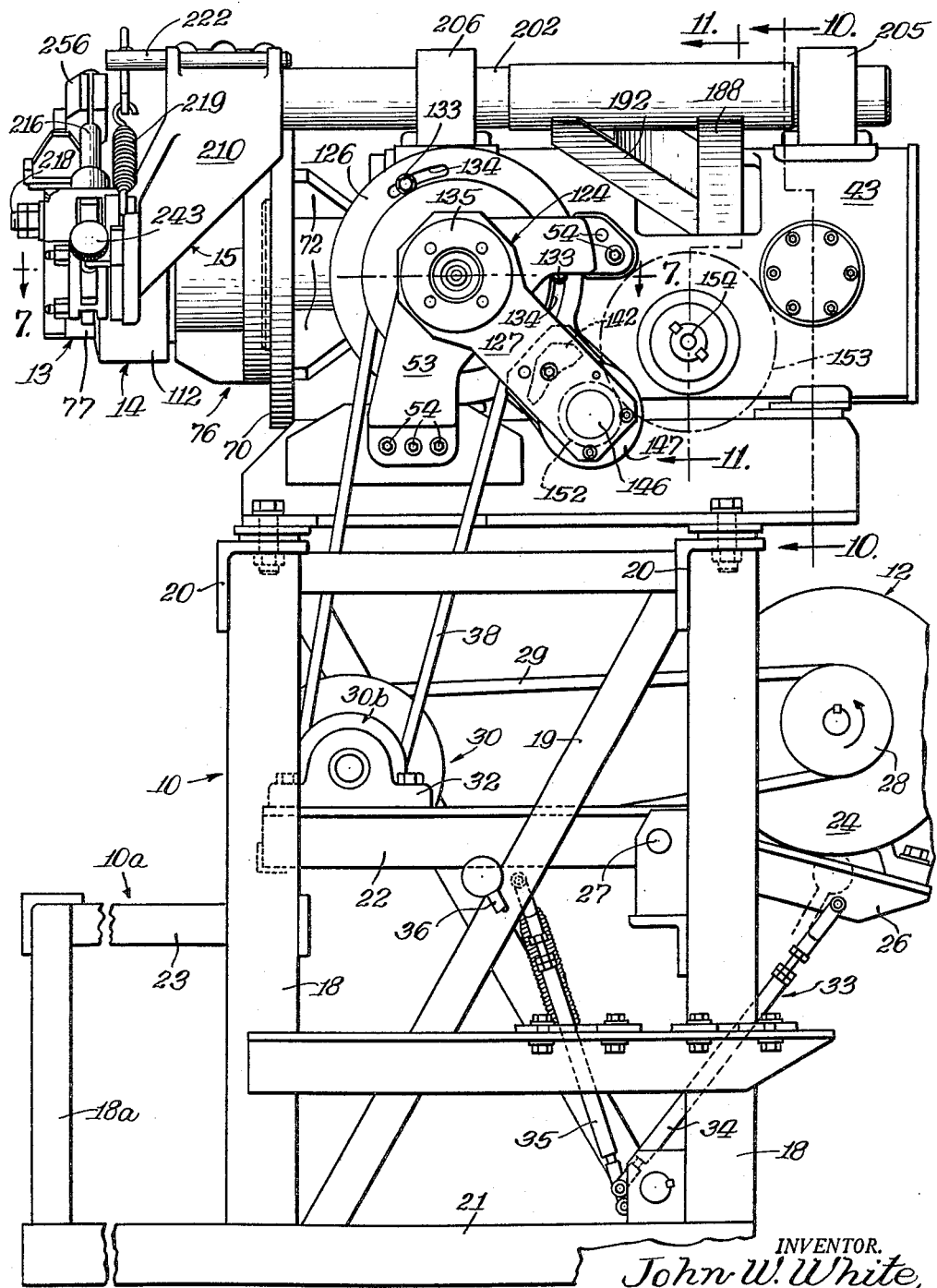
FIGURE 3 is an elevational view of the other side of the bead building machine of FIGURE 1 opposite that of FIGURE 2, taken along the line 3—3 on FIGURE 1 and looking in the direction indicated by the arrows.

Referring now particularly to FIGURES 1 through 3 of the drawings, I have shown a tire bead building machine constructed in accordance with the principles of my invention which comprises in its general organization or assembly of parts, main frame means 10 which provides for the support of main drive means 12 for former assembly means 13, bead material positioning means 14, and bead material guiding or laying means 15, and cut-off mechanism 16. Additionally, the main frame 10 includes an auxiliary frame support 10a which conveniently provides for the support of second motor means 17 for driving the cut-off saw of the cut-off mechanism or assembly 16.

The main frame or supporting structure 10 may take any suitable form and in effect constitutes a table or supporting structure for the above noted several components and assemblies of the machine of my present invention. It may, as shown, comprise a plurality of main vertical corner posts 18, and auxiliary vertical standard 18a for frame support 10a. A number of braces or strips 19 of various forms which together with horizontal upper and lower angle members 20 and 21, respectively, and intermediate horizontally extending frame means 22 and 23 provide for the support of a pair of electric motors, such as shown at 24 and 25 for the above mentioned main drive means 12 and second motor means 17, respectively.

The electric motor 24 of main drive means 12 is carried by angle members 26 pivotally mounted on a shaft 27 which is mounted at its opposite ends on frame structure 10 to provide for pivotal mounting of the motor to driving and non-driving positions on the frame structure 10. A cone pulley 28 is carried at one end of the armature shaft of motor 24 and an endless belt 29 is trained over cone pulley 28 and cone portion 30a of a dual cone pulley 30 mounted by means of suitable pillow blocks 32 on the horizontal frame members 22 of the frame 10. As shown in FIGURE 3 manually operable actuating means indicated generally at 33 has suitable connection with the angle members 26 and components of the frame structure 10 as by link elements 34 and 35 and including an actuating handle 36 which upon manual manipulation affords for the positioning of electric motor 24 to tighten or loosen endless belt 29 to selectively position the electric motor 24 in driving and non-driving relation, respectively, with respect to the dual cone pulley 30. The actuating means 33 per se forms no important aspect of my present invention and will not be further described in detail in that any suitable mechanism may be provided to afford for establishing connection and disconnection between the electric motor 24 of main drive means 12 and the dual cone pulley 30. The endless belt 29 may be associated with pulley grooves of different diameters of the cone pulley 28 and portion 30a of the dual cone pulley 30 to afford a desired ratio of drive from the electric motor 24 to the dual cone pulley 30. As best seen in FIGURES 1, 3, and 7, an endless drive belt 38 extends from the outer end portion 30b of the dual cone pulley 30 to a cone pulley 40 of the former assembly means 13. As shown, portion 30b of dual cone pulley 30 and cone pulley 40 are formed with a number of pulley grooves of different diameters to provide desired ratio of drive of pulley 40 by pulley 30 by selected positioning of drive belt 38.

In FIGURE 7 it will be seen that cone pulley 40 is keyed to an intermediate portion of an input drive shaft 42 which extends into one side of a main housing 43 enclosing several elements of the bead machine including certain parts of former assembly means 13. The input drive shaft 42 projects through and is rotatably supported adjacent its inner end in a bearing assembly 44 mounted in an opening provided therefor in housing 43 and which bearing assembly is retained in position by annular retainer member 45 secured to the side of the housing by a plurality of cap screws 46. A bevel pinion 47 is keyed to the inner end of the drive input shaft 42 and is retained in assembled position at the end of the shaft by a retainer 48.

The drive shaft 42 at its opposite or outer end as shown, is mounted in a ball bearing assembly, indicated generally at 50, and is held in position by retainer member 52 suitably secured to the adjacent end of the shaft. The outer race of ball bearing assembly 50 is received in a fixed outboard bearing support member 53 which, as best seen in FIGURE 3 is secured by a plurality of cap screws 54 to the adjacent side of main housing 43.

Upon reference again to FIGURE 7 it will be seen that bevel pinion 47 has meshing engagement with a bevel ring gear 56 secured to a tubular main spindle 57 intermediate the ends thereof and within main housing 43. The spindle 57 of former assembly means 13 is mounted for rotation within main housing 43 by the ball bearing assembly 58 supported in an intermediate transverse wall 59 of housing 43, and at its forward end portion projecting through an opening 60 in plate 61 secured to the open front wall of the housing 43 in a ball bearing assembly illustrated generally at 62. A retainer ring 63 secured in position by a plurality of cap screws 65 extending through the transverse wall 59 retains bearing assembly 58 in position. A spacing collar 66 is mounted on spindle 57 between bevel ring gear 56 and bearing assembly 62, and a hub 67 is secured to the spindle 57 at its forward end outwardly of bearing assembly 62. The hub 67 has a front end plate 70 secured thereto as by welding and a plurality of reinforcing fillets or braces 72 extend between plate 70 and hub 67. The plate 70 is formed with a forwardly projecting pilot portion 73 for piloting engagement in annular recess 74 in a rear end flange 75 of a mandrel 76. The mandrel 76 includes a substantially cylindrical tubular former 77 and reinforcing braces or fillets 78 extend between former 77 and end flange 75. The mandrel 76 is mounted on plate 70 by means of cap screws 79 which have threaded engagement with threaded openings therefor in flange 75. The inner end of spindle 57 within main housing 43, as shown, is received in the inner race 83 of the ball bearing assembly 58, and a spacer collar 84 extends between bevel ring gear 56 and inner race 83. A pair of lock nuts 86 have threaded engagement with the threaded inner end of spindle 57 to retain the parts in position.

In the bead machine as thus far described it will be seen that former 77 of former assembly means 13 is adapted to be rotated about its longitudinal axis upon imparting drive to input drive shaft 42 which through bevel pinion 47 affects rotation of bevel ring gear 56, spindle 57 and mandrel 76.

Several components of positioning means 14 are also seen in FIGURE 7, and it will be observed that such means is defined, in part, by a push rod assembly indicated generally at 90 comprising a shaft or push rod 92 extending coaxially of and through the hollow spindle 57 and through opening 96 in plate 70. The inner end of shaft 92 has a drive sleeve 93 secured thereto as by welding. A drive pin 94 is mounted in spindle 57 and extends inwardly into a lengthwise extending slot 95 of the drive sleeve 93 so that upon rotation of spindle 57 the shaft 92 is caused to be rotated in unison therewith. A coil spring 100 surrounds shaft or push rod 92 and at one end bears against drive sleeve 93 and at its other end engages the inner surface 102 of plate 70 surrounding opening 96. As shown, the forward end portion of shaft 92 is received within a hollow cylindrical sleeve 104 of push rod socket assembly 105.

The push rod socket assembly 105 includes a tubular mounting sleeve 107 suitably secured adjacent the outer or front end portion of sleeve 104 as by welding, and mounting sleeve 107 in turn carries a plurality of pusher blocks 108, three in the particular embodiment of my invention herein disclosed. The pusher blocks 108 are secured to the mounting sleeve 107 by cap screws 109 and a drive pin 110 may be assembled between the parts to afford for appropriate positioning and alignment prior to assembly.

The several pusher blocks 108 project radially outwardly from the mounting sleeve 107 through axially extending slots 111 formed in cylindrical former 77 of former assembly means 13. Positioning means 14 further comprises an annular collar 112 disposed coaxially of and surrounding the outer cylindrical surface of former 77 and is secured in position by cap screws 113 extending through the outer end portions of the several pusher blocks 108. An end cap 114 is secured by cap screw 115 to the outwardly or forwardly projecting end of push rod 92 for connecting the push rod socket assembly 105 to the push rod or shaft 92 for movement therewith.

By reason of the construction above described, it will be seen that push rod 92 is movable axially relative to spindle 57 and mandrel 76. In the position of the parts shown in FIGURE 7, the push rod 92 may be shifted to the left or in a forward direction by compressing spring 100, and upon release of biasing force urging the push rod 92 to the left the spring 100 returns it to the position shown. The purpose of the arrangement just described will be referred to in greater detail hereinafter.

The aforementioned drive means 12 further affords a power source for actuating positioning means 14 and disposing cut-off mechanism 16 to cutting and non-cutting positions, and in this regard, as best seen in FIGURE 7, input drive shaft 42 between cone pulley 40 and ball bearing assembly 50 has a grooved pulley 120 keyed thereto between a pair of retainer rings 122. A changer bracket 124 is secured to the side wall 125 of main housing 43 and comprises a pair of spaced inner and outer plate members 126 and 127 extending angularly downwardly rearwardly of housing 43 from input shaft 42. The inner plate member 126 at its upper circular end is formed with an opening 128 which fits about the periphery of retainer ring 45, and outer plate member 127 has an opening 130 which is supported on an annular shoulder 132 of outboard bearing bracket 53. As best seen in FIGURE 7, a plurality of cap screws 133 extend through arcuate slots 134 in the circular end of plate 126 and have threaded engagement with the housing 43. The slots 134 provide for adjusting the relative angular disposition of changer bracket 124 for a purpose to be described below. A retainer plate 135 retains outer plate 127 in position on bracket 53 and is held in position by cap screws 138 extending through retainer ring 135 and having threaded engagement with the bracket 53. The lower outer end portion of outer plate 127 is provided with a mounting plate 140 at the inner surface thereof and a transverse brace member 142 extends between the plate members 127 and 128. The mounting plate 140 together with a second supporting plate 145 welded to the transverse brace member 142 provides for support of shaft means indicated generally at 146. The shaft means 146 supports a grooved pulley 147 about which and the aforementioned grooved pulley 120, timing belt 150 is trained so that upon rotation of grooved pulley 120, grooved pulley 147 and shaft 146 are caused to be rotated in the bearing support provided by the supporting plates 140 and 145. Shaft means 146 at its end adjacent main housing 43 carries a gear 152 which meshes with a gear 153, which as best seen in FIGURES 3, 7, 10 and 11 is carried by counter-shaft means 154 extending transversely of and adjacent the rear portion of housing 43. The gears 152 and 153 may be adjusted relative to each other by means of changer bracket 124 as above described and afford a first timing adjustment means for the bead machine.

On continued reference to FIGURES 10 and 11, it will be seen that counter-shaft means 154 at its opposite end has a gear 158 removably mounted thereon and which has meshing engagement with a gear 160 carried by a cam shaft 162 which extends transversely of and adjacent the rear portion of housing 43 and above and rearwardly of counter-shaft 154. A pair of ball bearing assemblies 163 and 164 provide for journalling cam shaft 162 in side walls 125 and 167 of the housing 43, respectively, and as shown, a cover 168 is provided for enclosing bearing assembly 163 in side wall 125. A cam 170 is secured to the cam shaft 162 and provides for reciprocation of push rod 92 of positioning means 14, and second cam means indicated generally at 172, hereinafter described in detail, provides for disposing cut-off means 16 in cutting and non-cutting positions.

Referring now to FIGURES 10, 11 and 14 it will be observed that the cam 170 is adapted to have engagement with a cam follower 175 journalled in an arm portion 178 of a thrust pad 179. The thrust pad 179 is secured to a hollow stub shaft 180 which as shown is in alignment with push rod 92. A thrust bearing assembly 182 is disposed between the adjacent ends of push rod 92 and stub shaft 180 and as the high portion of cam 170 engages follower 175, the push rod 92 is advanced axially outwardly or forwardly of the machine compressing spring 100, and as the low portion of the cam engages the follower 175, the loaded spring 100 serves to return the push rod 92 and associated parts to their retracted positions shown in FIGURES 7 and 14. The thrust pad 179 at the portion thereof opposite arm 178 carries a guide roller 184 which rides in a slot on groove 185 in a guide block 186 suitably mounted in and extending inwardly of the side wall 167 of housing 43. The guide slot 185 in the guide member 186 is of a length to afford guided movement of hollow stub shaft 180 and push rod 92 within the limits effected by the throw of cam 170 in the rotation of the cam shaft 162.

It will be clear from the foregoing that the gears 152 and 153 afford for driving of counter shaft 154, and gears 158 and 160 effect rotation of cam shaft 162, and since the latter carries cam 170, it provides for the axial reciprocation of push rod 92 to effect movement of positioning means 14 relative to the lengthwise axis of rotation of former 77 in effecting the construction of a bead on the former 77 as will be hereinafter related.

The bead material guiding or laying means 15 is associated with positioning means 14 and as best seen in FIGURES 4, 11 and 14 comprises arm members 188 and 192 which have connection at their inner ends with thrust pad 179 and at their outer or opposite ends are suitably connected as by welding or the like to an outer tubular supporting sleeve 200 through which a hollow shaft 202 extends lengthwise of the machine at side 125 of housing 43. The sleeve 200 and shaft 202 are connected together and shaft 202 is mounted for sliding movement on its longitudinal axis in bearings carried by bracket members 205 and 206, respectively, which are suitably secured to the top wall 207 of housing 43. The shaft 202 at its outer forwardly projecting end has a bracket 210 secured thereto and the bracket 210 provides for the support of various components for laying tire bead material on former 77.

As best seen in FIGURES 1, 4, 5 and 6 arm assembly 214 comprises an arm 216 having a bifurcated bracket 217 pivotally mounted on bolt 218 carried by bracket 210. A spring 219 has connection at one end with arm 220 of bracket 217 and the spring 219 at its other end has connection by means of an adjustable spring connector 220 to pin 221 mounted in bracket 210. In the position of the parts as viewed in FIGURE 5 of the drawings, the spring 219 tends to rotate press arm assembly 214 in a counter clockwise direction about bolt 218.

A casting roller assembly 224 includes an arm 225 pivotally mounted at one end on bolt 218 between the arms of bifurcated bracket 217 and the arm 225 at its other end has a yoke 230 pivotally mounted thereon as at 237. The outer ends of the arms of the yoke 230 carry rollers 238 disposed to either side of a roller 239 rotatably mounted as at 240 on bracket 210. A frame element 242 at the lower end of bracket 210 provides for the support of an adjusting screw 243 which co-operates with a shoulder 244 on bracket 225 to afford for positioning of bracket 225 about the bolt 218 to dispose the pair of rollers 238 in desired spaced relation with respect to the rotatable roller 239 carried by bracket 210. A guide finger 250 is fixedly connected to lug 252 at the lower end of main bracket 210 and the latter serves as a guide for guiding bead material drawn from a supply of tire bead material for threading between the pair of rollers 239 and roller 238. The pivot 237 provides for free floating of the yoke 230, and adjusting screw 243 by its engagement with shoulder 244 limits pivotal movement of cam 225 about bolt 218, whereby the pair of rollers 238 are movable relative to the fixed roller 239 to assist in passage of the tire bead material over the fixed roller 239 and preset the same for laying on the former 77. The press arm assembly 214 at its outer projecting end carries a laying roller assembly 255 comprising a frame 256 suitably mounted for adjustment axially on shaft 216. The frame 256 rotatably supports a stitching roller 258 and a side guide roller 260 laterally off set with respect to the stitching roller 258. As shown in FIGURES 5 and 6 bead material, after passing through the casting roller assembly 224 comprising the fixed roller 239 and rollers 238, is guided by the side guide roller 260 on former 77 adjacent collar 112 of positioning means 14 and the bead material is layed on the former 77 with successive convolutions stitched by stitch roller 258.

Coming now to cut-off mechanism 16, reference firstly may be had to FIGURES 8, 9, 10 and 12 in which it will be seen that the cam means 172 thereof includes a cam impeller member 265 having a split hub portion 266 adapted to be secured about cam shaft 162 by a pair of cap screws 267. The cam impeller is provided with an end flange 268 having diametrically opposed end ear portions 270 in which follower rollers 272 and 273 are rotatably supported to project laterally in opposite directions axially of cam shaft 162 for cooperation with cam surfaces 274 and 275 of spaced cam plates 276 and 277, respectively. The cam plates 276 and 277 are assembled in spaced apart parallel relation axially of cam shaft 162 at opposite sides of flange 268 by suitable connection with a vertical reciprocal shaft 280 which, as shown, is mounted in journal portion at its upper and lower ends in slide bearings 282 and 283 carried, respectively, in the top and bottom walls 207 and 284 of the housing 43. The cam plate 276 is formed with a cam recess 285 and the cam plate 277 is formed with a raised cam surface 286 adapted to be engaged, respectively, by the follower rollers 272 and 273. As best seen in FIGURE 9, rear end wall 290 of housing 43 carries a slide guide 292 lying between the adjacent rear end edge portions of the spaced cam plates 276 and 277 to afford for guiding vertical movement of the same together with shaft 280. Shaft 280 at its lower end projects outwardly of bottom wall 284 of housing 43 and has pivotal connection with one end of link means 300, which at its other end, as seen in FIGURE 8 has pivotal connection at 302 with an actuator arm 303 cutter rocking means indicated generally at 304.

Referring now particularly to FIGURES 8, 12 and 13 the cut-off actuator arm 303 includes an integral boss 305 journalled on the end of a bearing plug 306 secured as by welding within the end of a tubular cut-off support shaft 307. A retainer cap 308 is mounted by a cap screw 309 at the outer end of bearing plug 306 to retain actuator arm 303 in position about bearing plug 306. A cut-off adjusting plate 310 is disposed freely about bearing 306 and is assembled with an end flange 312, fixed as by welding at the end of cut-off support shaft 307, by cap screws 314. The end flange 312 is formed with arcuate slots 318 through which the cap screws 314 extend to provide for positioning plate 310 relative to end flange 312.

The cut-off adjusting plate 310 at its lower end carries a bifurcated bracket 320 through which an adjustment screw 322 extends and bears against a hardened surface 323 formed at the lower outer corner of cut-off actuator arm 303. The cut-off actuator arm 303 has a bifurcated bracket 324 secured thereto and between the outer ends of the arms of which a pin 325 extends to serve as an anchor for one end of a coil spring 326. The spring 326 is anchored at its other or opposite end at 327 to the outwardly projecting arm 320 of cut-off actuator arm 303.

It thus will be seen that upon vertical reciprocating movement of shaft 280 that link 300 causes rotary movement of cut-off actuator arm 303 and it through spring 326 rotates adjusting plate 310, which since it is secured to end flange 312 by cap screws 314 effects rotation of cut-off support shaft 307. It will be seen by reason of the construction described that the extent of throw of cut-off support shaft 307 may be conveniently adjusted within limits afforded by the arcuate slots 318.

Upon reference now to FIGURES 2 and 13, it will be observed that cut-off support shaft 307 extends lengthwise of machine adjacent side wall 167 of housing 43 and is suitably journalled within a housing 330 secured to the upper platform of the main frame for the machine. The forwardly projecting end of shaft 307 has a cut-off wheel supporting bracket 332 keyed at 333 thereon. A cone pulley 334 is journalled about bearing assemblies 335 and 336 at the reduced outer end portion of a plug member 338 mounted within the outer or forward end of cut-off support shaft 307. A retainer 340 retains the cone pulley 334 in position about plug member 338. A drive belt 342 extends from cone pulley 342 to a cone pulley 343 of the secondary drive motor 25. A second drive belt 345 extends from cone pulley 334 to pulley wheel 346 mounted on a shaft 347 supported for rotation in the bifurcated upper end 348 of bracket 350. A cut-off saw 352 is mounted adjacent the inner end of the shaft 347. Thus, it will be observed that the motor 25 through cone pulley 343, belt 342, cone pulley 340, and belt 345 extending to pulley 346 affords for the rotation of the cut-off saw 352. Since the bracket 332 is connected with the cut-off support shaft 307, rocking movement of the latter through the mechanism aforedescribed affords for disposal of the cut-off saw 352 in cutting and non-cutting positions relative to former 77.

By reason of the aforedescribed construction and arrangement of components and assemblies, it will be observed that the former 77 of the machine of my invention is adapted to be continuously driven by main drive means 12, and as perhaps best seen in FIGURES 4 and 5, tire bead material M from any suitable source of supply is guided or layed on the periphery of former 77 at bead starting position A by bead material guiding or laying means 15. After predetermined rotation of the former 77 winding tire bead material from the supply source at bead starting position A, positioning means 14 is caused to be actuated moving collar 112 axially outwardly and forwardly relative to former 77 to advance wound bead material on the former surface from the bead starting position A to bead finishing position B. As the wound bead material is moved from bead starting position A to bead finishing position B the bead material laying or guiding means 15 moves conjointly with collar 112 so as to provide for the continued superposed winding of tire bead material from the supply. When the wound bead material is advanced to the bead finishing position B, the bead material positioning means 14 under control of cam 170 retracts collar 112 to its bead starting position. When collar 112 is retracted a length of bead material C extends on the surface of former 77 from the bead finishing position B to bead starting position A. After formation of the succeeding bead has begun and the latter is self-adhering on the former, cut-off mechanism 16 is actuated through the means described to sever the connecting or cross-over portion C. The cycle of operation of the machine is then again repeated and the succeeding bead being formed at bead starting position A is advanced by the collar to bead finishing position B. In such movement of the wound bead material successive beads are caused to be abutted, end to end, against each other at bead finishing position B which effects appropriate disposal of the severed ends of adjacent beads with their respective beads. In this manner, tire beads are continuously formed on the continuously rotating former 77 and the completed beads are advanced on the former 77 until discharged from the outer forward end thereof.

It will be clear from the several components and assemblies of the tire bead machine as above described that the speed of rotation of former 77 is readily controlled by means of the multiple cone pulleys of main drive means 12. Also, it is significant to observe that first timing means is afforded by gears 152 and 153 and second timing means is afforded by gears 158 and 160 to provide for the predetermined rotation of cam shaft 162 which controls the time and sequence of operation of positioning means 14 and cut-off mechanism 16. Also, the cam 170 for actuating the positioning means 14 may be formed with appropriate profile to effect the desired movement or actuation of the positioning means 14 for advancing bead material from the bead starting position A to the bead finishing position B, and to control the extent of cross-over material C between the bead finishing and starting positions.

Preferably, as shown, the cam 170 begins to advance wound bead material from the bead starting position A to the bead finishing position B after a tire bead is about half wound on the former so that the second half of the bead is made as wound bead material is advanced on the former to bead finishing position B. The cam means 172 for actuating the cut-off mechanism 16 is also suitably preferably arranged so as not to be actuated until material is wound on the former 77 at bead starting position in sufficient amount to assure retaining the bead material on the former. Also, adjustment of cam means 172 provides for severing of cross-over portion C at any desired portion thereof. In the operation of the machine, the main drive means is continuously operated without interruption and the drive motor 25 for the cut-off mechanism is continuously driven so that the cut-off saw 352 constantly rotates and is operative to sever the cross-over material C between succeeding beads when advanced in cutting position relative to the former 77. It is thus clear from the above description that the main drive means 12 affords for the constant rotation of the former 77 and such drive means is utilized to effect actuation of positioning means 14 to dispose collar 112 in bead starting and bead finishing positions and also provides for the disposal of cut-off mechanism 17 to its non-cutting and cutting positions. As has already been observed, the secondary drive means comprising electric motor 25 affords for driving of the cutter disc to sever linking material between successive beads formed on the former 77.

The apparatus aforedescribed also may be readily adapted to build tire beads of any desired diameter by substitution of a mandrel assembly 76 and bead collar 112 of dimensions to provide a former 77 having a former surface of a diameter comforming to the inside diameter for the tire beads and a collar 112 for cooperating with the former as above described. The several aforedescribed adjusting and timing means for the several assemblies may accordingly be regulated to provide the desired end tire beads.

While I have shown and described a preferred embodiment of apparatus of my invention, it will be readily understood that various modifications and rearrangements may be made therein without departing from the spirit and scope of my invention.

I claim:

1. A machine for building tire beads comprising a rotatable former having an outer substantially cylindrical surface of which a first portion provides a bead starting position, said cylindrical surface having a second portion providing a bead finishing position in axially spaced relation away from said bead starting position, guide means for guiding tire bead material to the former for winding thereon in superposed convolutions, positioning means disposed circumferentially around said cylindrical surface and having a portion for engaging tire bead material wound on said former, means for mounting said positioning means for movement relative to said former longitudinally of the axis of rotation of the latter from said bead starting position to said bead finishing position to engage said portion of said positioning means with wound bead material at said bead starting position and move said wound tire bead material to said bead finishing position, and means connecting said guide means for conjoint movement with said positioning means to effect the continued winding of tire bead material around the tire bead material wound at said bead starting position during movement of the tire bead material by said positioning means to said bead finishing position.

2. A tire bead building machine comprising a former having an outer substantially cylindrical surface a first portion of which provides a bead starting position for the winding of tire bead material in superposed convolutions therearound, said cylindrical surface having a second portion providing a bead finishing position axially spaced a distance in excess of the width of the tire bead material away from said bead starting position, guide means for guiding tire bead material to the former for winding thereon, positioning means disposed outwardly of said cylindrical surface and having a portion for engaging tire bead material wound on said former, means connecting said guide means and said positioning means for conjoint reciprocatory movement between said bead starting position and said bead finishing position, said portion of said positioning means in movement of the latter from said bead starting position to said bead finishing position engaging and moving tire bead material wound at said bead starting position to said bead finishing position, said guide means in its conjoint movement with said positioning means from said bead starting position to said bead finishing position effecting the continued laying of tire bead material around the tire bead material wound at said bead starting position to said bead finishing position to form a completed tire bead at said bead finishing position, and said guide means in the conjoint movement of the same and said positioning means from said bead finishing position to said bead starting position effecting laying of tire bead material on said cylindrical surface of said former between said bead finishing position and said bead starting position extending from the outer convolution of said completed tire bead to the cylindrical surface of said former at said bead starting position for beginning the formation of a succeeding bead on said former at said bead starting position.

3. The tire building machine of claim 2 characterized by the provision of cut-off means operable in predetermined timed relation subsequent to movement of said positioning means and said guide means from said bead finishing position to said bead starting position for severing the length of tire bead material on said cylindrical surface between said bead finishing position and said bead starting position.

4. The tire building machine of claim 2 characterized by the provision of means for moving said positioning means and said guide means from said bead starting position to said bead finishing position during a first predetermined time interval and during a second predetermined time interval less than said first predetermined time interval from said bead finishing position to said bead starting position.

5. The tire building machine of claim 2 characterized by the provision of means for moving said positioning means and said guide means from said bead starting position to said bead finishing position during a first predetermined time interval and during a second predetermined time interval less than said first predetermined time interval from said bead finishing position to said bead starting position, and cut-off means operable in predetermined timed relation subsequent to movement of said positioning means and said guide means from said bead finishing position to said bead starting position for severing the tire bead material on said cylindrical surface between said bead finishing position and said bead starting position 6. The tire building machine of claim 2 characterized by the provision of first drive means for driving said former at a predetermined speed of rotation, second drive means for moving said guide means and said positioning means from said bead starting position to said bead finishing position during a first predetermined time interval and during a second predetermined time interval less than said first predetermined time interval from said bead finishing position to said bead starting position, said predetermined speed of rotation of said former and said second predetermined time interval being such as to effect the laying of the tire bead material on said cylindrical surface of said former between said bead finishing position and said bead starting position of a length less than a full convolution, and cut-off means operable in predetermined timed relation subsequent to movement of said positioning means and said guide means from said bead finishing position to said bead starting position for severing said length of tire bead material on said cylindrical surface between said bead finishing position and said bead starting position.

7. The tire bead building machine of claim 2 characterized by the provision of first drive means for driving said former at a predetermined speed of rotation, second drive means for moving said guide means and said positioning means from said bead starting position to said bead finishing position during a first predetermined time interval and during a second predetermined time interval and during a second predetermined time interval less than said first predetermined time interval from said bead finishing position to said bead starting position, said predetermined speed of rotation of said former and said second predetermined time interval being such as to effect the laying of the tire bead material on said cylindrical surface of said former between said bead starting position and said bead finishing position of a length less than a full convolution, and means for said first drive means for adjusting the speed of rotation of said former.

8. The tire bead building machine of claim 2 characterized by the provision of first drive means for driving said former at a predetermined speed of rotation, second drive means for moving said guide means and said positioning means from said bead starting position to said bead finishing position during a first predetermined time interval and during a second predetermined time interval less than said first predetermined time interval from said bead finishing position to said bead starting position, said predetermined speed of rotation of said former and said second predetermined time interval being such as to effect the laying of tire bead material on said cylindrical surface of said former between said bead starting position and said bead finishing position of a length less than a full convolution, and means for said first drive means for adjusting the speed of rotation of said former, and for adjusting said second drive means for adjusting the duration of said first and second predetermined time intervals of movement of said positioning means and said guide means.

9. The tire bead building machine of claim 2 characterized by the provision of first drive means for driving said former at a predetermined speed of rotation, second drive means for moving said guide means and said positioning means from said bead starting position to said bead finishing position during a first predetermined time interval and during a second predetermined time interval less than said first predetermined time interval from said bead finishing position to said bead starting position, said predetermined speed of rotation of said former and said second predetermined time interval being such as to effect the laying of tire bead material on said cylindrical surface of said former between said bead finishing position and said bead starting position of a length less than a full convolution, means for said first drive means for adjusting the speed of rotation of said former, and for adjusting said second drive means for adjusting the duration of said first and second predetermined time intervals of movement of said positioning means and said guide means, cut-off means operable in predetermined timed relation subsequent to movement of said positioning means and said guide means from said bead finishing position to said bead starting position for severing said length of tire bead material on said cylindrical surface between said bead finishing position and said bead starting position, and means for said cut-off means for adjusting the predetermined time of severing of said length of tire bead material on said cylindrical surface of said former between said bead finishing position and said bead starting position.

References Cited in the file of this patent

UNITED STATES PATENTS

| | | |
|---|---|---|
| 1,841,260 | Slusher | Jan. 12, 1932 |
| 1,927,811 | Stevens | Sept. 19, 1933 |
| 1,986,094 | Allan | Jan. 1, 1935 |
| 2,049,587 | Lehman | Aug. 4, 1936 |
| 2,846,157 | Stephens | Aug. 5, 1958 |